United States Patent [19]

Kent

[11] Patent Number: 4,688,656

[45] Date of Patent: Aug. 25, 1987

[54] SAFETY DEVICE

[76] Inventor: Erma W. Kent, 201 Bass Rd., Macon, Ga. 31210

[21] Appl. No.: 751,868

[22] Filed: Jul. 5, 1985

[51] Int. Cl.[4] .................... B60K 28/14; B60R 21/34
[52] U.S. Cl. .................................. 180/279; 293/15; 293/34; 293/117
[58] Field of Search ............... 180/274, 275, 276, 277, 180/279; 293/15, 34, 117; 200/180, 332, 335

[56] References Cited

U.S. PATENT DOCUMENTS

| Re. 15,467 | 10/1922 | Schauman | 180/278 |
| 1,418,678 | 6/1922 | Schauman | 180/279 |
| 1,682,731 | 9/1928 | Austin | 180/279 |
| 1,716,106 | 6/1929 | Bricuglio | 298/34 |
| 2,180,846 | 11/1939 | Karl | 180/276 |
| 2,824,185 | 2/1958 | Sevey | 200/332 |
| 3,560,922 | 2/1971 | Wilson | 180/279 |
| 3,681,610 | 8/1972 | Pratt | 180/279 |

OTHER PUBLICATIONS

"Safety Grill Designed for School Buses", *Trailer Built*, Jan. 1984, p. 41.

Primary Examiner—John J. Love
Assistant Examiner—Karin L. Ferriter
Attorney, Agent, or Firm—Roylance, Abrams, Berdo & Goodman

[57] ABSTRACT

A safety device attachable to a motor vehicle for preventing the motor vehicle from running over an object, the device including a plate assembly, a safety bar assembly slidably connected to the plate assembly, a first mechanism for raising and lowering the safety bar assembly with respect to the plate assembly, at least one switch assembly and a second mechanism for turning off the motor vehicle. The plate assembly includes first and second plate members which are spaced apart in parallel. The second plate member is pivotably connected to the first plate member. The second plate member pivots around a horizontal axis. The first mechanism is attached to the second plate member. The safety bar assembly is attached to the second plate such that it can only slide relative to the second plate in a direction towards and away from the second plate. The switch assembly is attached to the first plate and extends to contact the second plate. The switch assembly is connected to the second mechanism. When the safety bar assembly is contacted by an object, the second plate member pivots relative to the first plate member about its horizontal axis and causes the switch assembly and the second mechanism to turn off the motor vehicle. In addition, the safety device may include an audio device for emitting an audio signal when the second plate pivots relative to the first plate.

20 Claims, 15 Drawing Figures

SAFETY DEVICE

FIELD OF THE INVENTION

This invention relates to safety devices for motor vehicles. More particularly, this invention relates to safety devices for preventing a motor vehicle from running over children, animals, or other objects.

BACKGROUND OF THE INVENTION

School buses are a primary mode of transportation for transporting children to and from school and school activities. Since school districts are steadily increasing in size due to the consolidation of smaller districts and also due to the increasing number of school closings within districts, school buses are becoming an even more important mode of transporting students as the average distance a student must travel to school is increasing.

Unfortunately, each school year school buses are involved in a number of accidents which injure or kill students. In fact, a recent study by the Kansas Department of Education indicated that 31 school children were killed by school buses in the school year 1977-1978, 38 school children were killed by school buses in the school year 1978-1979, 25 school children were killed by school buses in the school year 1979-1980, 21 school children were killed by school buses in the school year 1980-1981, 26 school children were killed by school buses in the school year 1981-1982 and 17 school children were killed by school buses in the school year 1982-1983. Of these fatalities, a majority of the children were in front of the bus when they were killed. A large number of these accidents occurred when the child fell or stumbled either when he or she was getting off the bus or boarding the bus. The child would end up under the bus and the bus driver would resume operation unaware that the child had fallen under the bus.

Of course, these types of accidents are not limited to school buses, but also occur with other vehicles such as delivery, garbage, dump, and other types of trucks and vans. This invention also has utility on these other types of motor vehicles. The use of the invention on school buses is emphasized herein for purposes of illustration.

It is apparent that there is a need to prevent accidents wherein a child falls underneath a school bus or another motor vehicle and then is run over by that vehicle. This invention fulfills this need in the art, as well as other needs which will become apparent to those skilled in the art once given this disclosure.

Generally speaking, this invention provides a safety device for preventing a motor vehicle from running over an object, the safety device being attachable to the vehicle and comprising a first assembly including first and second members, the members being spaced apart, the second member being pivotably connected to the first member; a safety bar assembly slidably connected to the first assembly; a first mechanism for raising and lowering the safety bar assembly with respect to the first assembly; at least one switch assembly extending between the members; a second mechanism for turning off the motor vehicle, this second mechanism being connected to the switch assembly; wherein when the safety bar assembly is contacted by an object, the second member pivots relative to the first member and causes the switch assembly and the second mechanism to turn off the motor of the motor vehicle.

In certain embodiments of this invention, the members are flat, rectangular plates which are spaced in parallel when the safety device is not in contact with an object. The plate members may be vertically oriented.

In yet other embodiments, the members are two rectangular bars.

In other embodiments, the safety device is attachable to the front bumper of a vehicle. When so attached, the safety device extends forward of the front bumper of the vehicle and provides further cushioning and shock absorption if the vehicle should become involved in a front-end collision.

In further embodiments of this invention, the first assembly includes springs which extend between the two members. The springs bias the second member away from the first member.

In other embodiments of this invention, the second member rotates about a horizontal axis located at its longitudinal center line. When the safety device strikes an object, the bottom half of the second member rotates towards the first member and the top half rotates away from the first member.

In yet other embodiments of this invention, the first mechanism is a power cylinder which is attached to the second member. The power cylinder has an extendible rod which is connected to the safety bar assembly. When the safety bar assembly is contacted by an object, the rigid connection of the extendible rod of the power cylinder to the safety bar assembly causes the power cylinder and second member to pivot about the axis of the second member relative to the first member. The power cylinder may be an air or fluid cylinder.

In other embodiments of this invention, the safety bar assembly has two basic positions, an up position which the safety bar assembly is in when the vehicle is moving, and a down position which the safety bar assembly is in when the vehicle is stopped and children are boarding or disembarking from the school bus. In some embodiments of this invention, the safety bar assembly is moved to the down position whenever the door of the school bus is open. In other embodiments, the safety bar assembly is lowered when the outside stop sign arm of the bus is extended. Springs may be employed to raise the safety bar assembly to the up position from the down position.

The safety devices according to this invention have many advantages over the prior safety devices for preventing a motor vehicle from running over an object. The safety devices according to this invention have particular utility on school buses wherein the devices prevent children from falling underneath a school bus as they are boarding and disembarking from the school bus. The safety bar assembly in the down position has a very low profile with respect to the ground. When the safety bar assembly is in the down position, it is virtually impossible for a child to fall and roll underneath the safety bar assembly due to this low profile.

In addition, since the bus is shut off whenever the safety bar assembly is contacted by an object, the driver cannot inadvertently drive over a child which has contacted the safety bar assembly. Since the bus is shut off, it is impossible for driver ignorance or error to cause the accident.

It is a further advantage of the safety devices according to this invention that they are relatively inexpensive, yet easy to install, service and maintain.

Yet another advantage of this invention is that if the devices according to this invention are connected to the door or extendible stop arm of the bus, the safety bar assembly will automatically drop to its lower position whenever the door is opened or the safety arm extended. This automatic feature again eliminates the chances of driver error as the driver does not have to activate the mechanism each time the bus stops to pick up or drop off children.

It is also an advantage of this invention that the safety bar assembly can be kept in the up position when the bus is being operated in deep snow or mud. Override switches can be provided to maintain the safety bar assembly in the up position.

Moreover, when the safety devices are connected to the door or extendible stop arm of the school buses, the safety bar assembly is in its maximum protection mode (in its low position) during the critical times, that being when children are getting on and off the school bus.

A further advantage of this invention is that the safety devices act as an additional bumper for the vehicle and add additional shock absorbency if the vehicles are struck in the front end. Also, if the safety devices are attached to the front of motor vehicles, the safety devices may deflect objects in the path of the vehicle even when the devices are in their up positions.

A further advantage of this invention is that the safety devices may also be adjusted to prevent the bus from being driven at excess speeds. The safety devices may be adjusted such that the force of the wind resistance on the safety bar assembly may activate the safety device and shut off the bus if the bus is travelling at too high a speed.

Yet another advantage of the safety devices according to this invention is that they are durable and are very reliable. Due to the relative simplicity of the devices, breakdowns are infrequent. Even if such breakdowns occur, switches can be provided to render the bus operative. The entire safety device can be easily removed if necessary and replaced by a new safety device so that the "down time" for the bus is minimal.

BRIEF DESCRIPTION OF THE DRAWINGS

Certain embodiments of this invention are illustrated in the attached drawings, wherein;

FIG. 5 is a cross-sectional side view taken along the same line as FIG. 4, however, FIG. 5 illustrates the outer plate being rotated with respect to the inner plate.

DETAILED DESCRIPTION OF THE DRAWINGS

Figure 1:
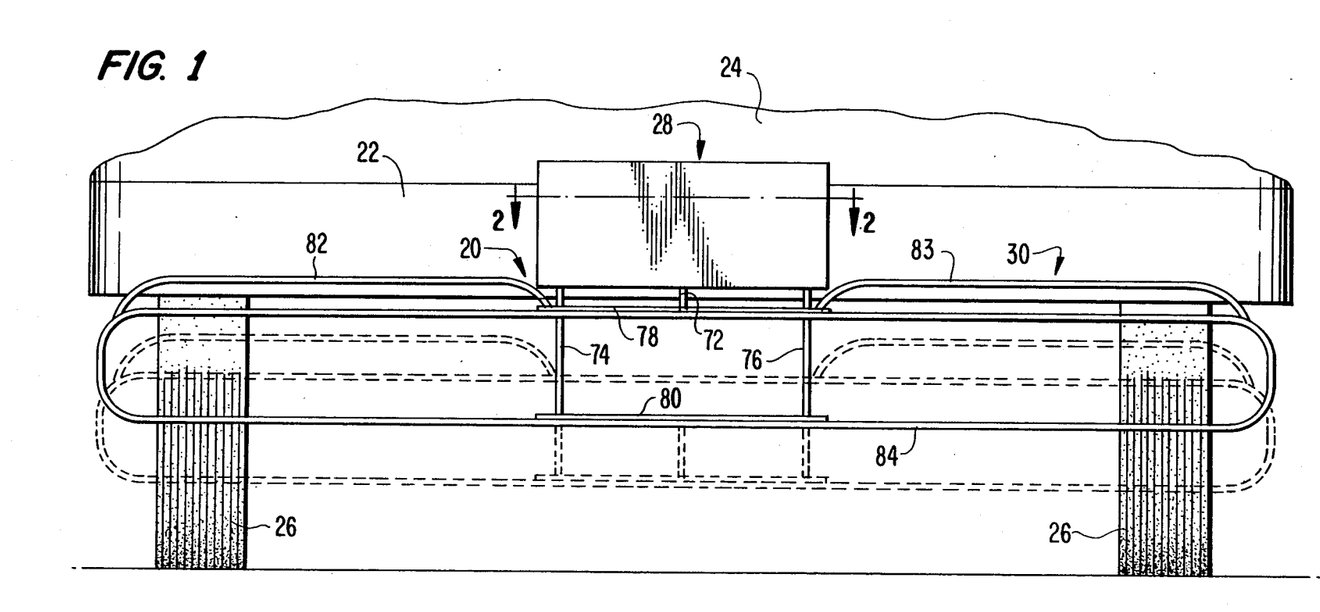
FIG. 1 is a front view of a safety device according to this invention installed on the front bumper of a school bus.

Referring to the Figures, in particular FIG. 1, a safety device according to this invention, safety device 20, is illustrated attached to the front bumper 22 of school bus 24. Safety device 20 is positioned in front of front bumper 22 and extends forward of the front wheels 26 of the bus 24.

In the embodiment illustrated in the Figures, safety device 20 includes first (or plate) assembly 28 which is attached to bumper 22 and safety bar assembly 30 which is slidably connected to plate assembly 28.

Plate assembly 28 in turn includes back plate 32, front plate 34, power cylinder assembly 36, switch assemblies 38 and 40, pivot spring assemblies 42 and 44, lower spring assemblies 46 and 48, rod bearing blocks 50 and 52, and a housing including top plate 54, bottom plate 56, front plate 58 and side housing plates 60 and 62. In other embodiments, plates 32 and 34 can be replaced by members of other geometric shapes, such as rectangular bars.

Figure 6:
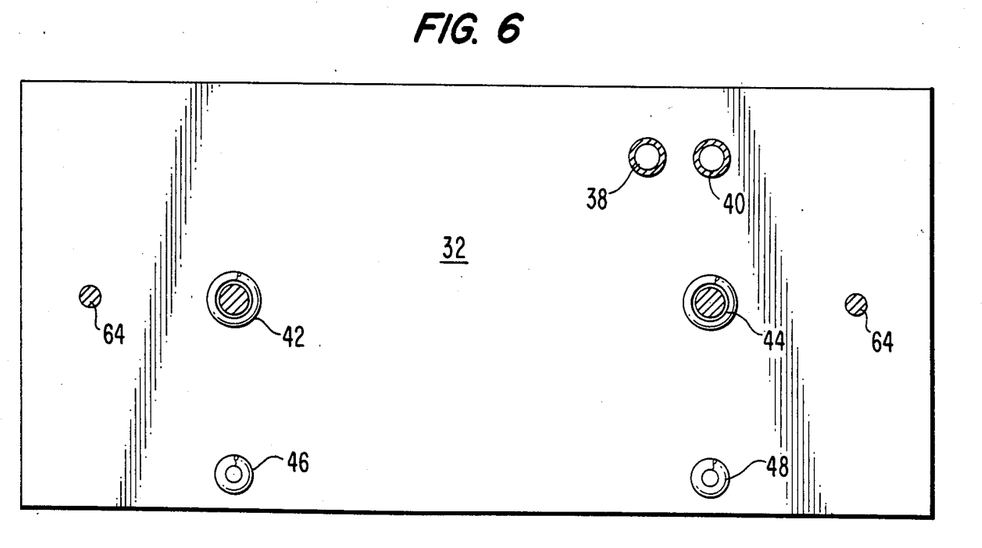
FIG. 6 is a cross-sectional view of the plate assembly illustrated in FIGS. 2-5, taken along line 6—6 of FIG. 2.

Back plate 32 is a rectangular flat plate which is attached to bumper 22 by bolt assemblies 64 (see FIG. 6). Likewise, front plate 34 is a rectangular flat plate. Back plate 32 and front plate 34 lie in parallel vertical planes when the safety device 20 is not in contact with an object, as discussed below. Front plate 34 is pivotably attached to back plate 32 by pivot spring assemblies 42 and 44.

Pivot spring assemblies 42 and 44 are well known in the art and thus are not illustrated in detail. The assemblies 42 and 44 have one of their ends attached to each of the plates 32 and 34. Pivot spring assemblies 42 and 44 are located on the horizontal mid-line of plates 32 and 34. Thus, since front plate 34 is pivotably attached to back plate 32, front plate 34 pivots about its longitudinal mid-line with respect to back plate 32 (see FIG. 5).

Figure 3:
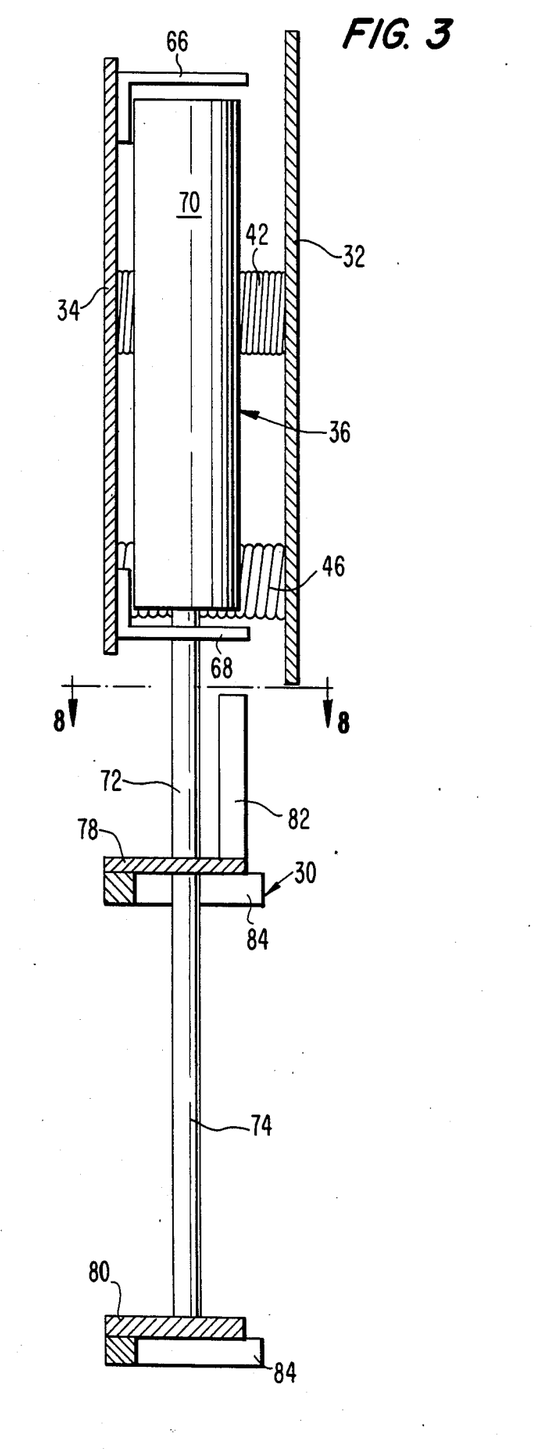
FIG. 3 is a cross-sectional side view of the embodiment of this invention illustrated in FIGS. 1 and 2 taken along line 3—3 of FIG. 2.
Figure 4:
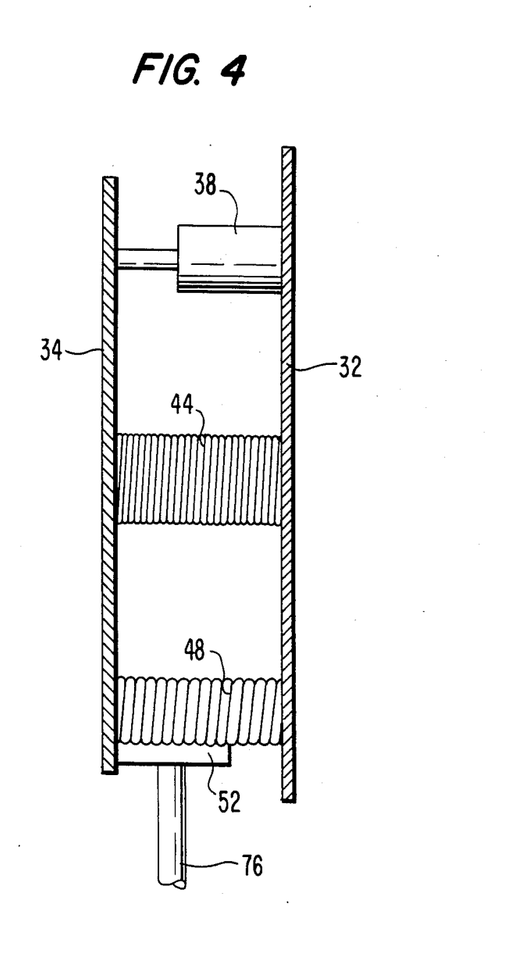
FIG. 4 is another partial cross-sectional side view of the plate assembly illustrated in FIGS. 1-3 taken along line 4—4 of FIG. 2.
Figure 5:
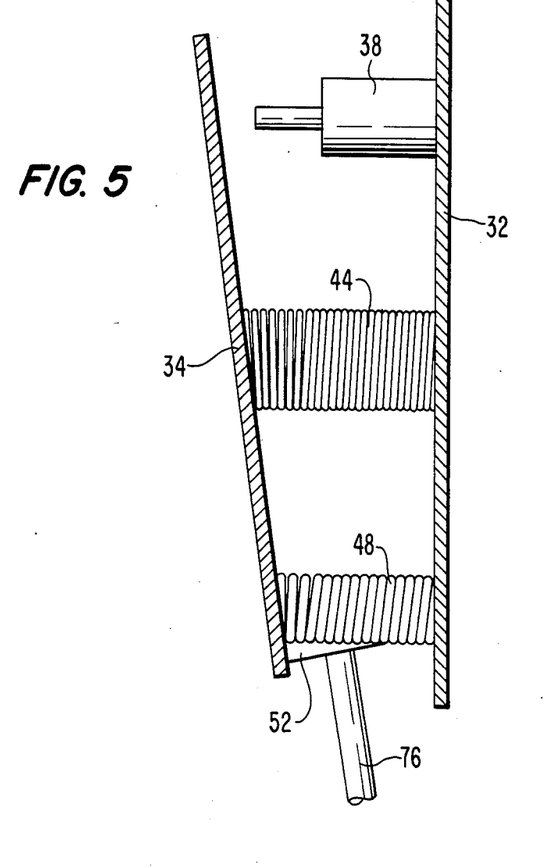

Bottom spring assemblies 46 and 48 are coil springs and are connected on their ends to back plate 32 and front plate 34 (see FIGS. 3-5). Lower spring assemblies 46 and 48 retain back plate 32 and front plate 34 in parallel orientation when safety bar assembly 30 is not in contact with an object.

Power cylinder assembly 36 includes upper bracket 66, lower bracket 68, power cylinder 70 and extendible rod 72. Upper bracket 66 and lower bracket 68 are both L-shaped, having one leg attached to front plate 34. The other leg of the "L" extends outwardly from front plate 34 (see FIG. 3). Power cylinder 70 can be of any of the types well known in the industry, (such as an air or hydraulic cylinder) and is connected to brackets 66 and 68. Power cylinder 70 is received between the legs of brackets 66 and 68 which extend horizontally away from front plate 34. Extendible arm 72 protrudes downwardly away from power cylinder 70 through a hole in the horizontal leg of lower bracket 68 and extends and retracts as power cylinder 70 is operated. The bottom end of extendible rod 72 is attached to safety bar assembly 30, as discussed below.

Switch assemblies 38 and 40 extend between back plate 32 and front plate 34. Such switch assemblies are well known in the industry and thus are not described in detail herein. The base ends of switch assemblies 38 and 40 are attached to back plate 32 and the arms of the switch assemblies 38 and 40 extend outward to contact front plate 34.

Switch assemblies 38 and 40 are positioned above the pivot line for plate 34 so that as plate 34 pivotably when safety bar assembly 30 is contacted by an object, the upper portion of plate 34 is swung out of contact with switch assemblies 38 and 40 (see FIG. 5).

Figure 2:
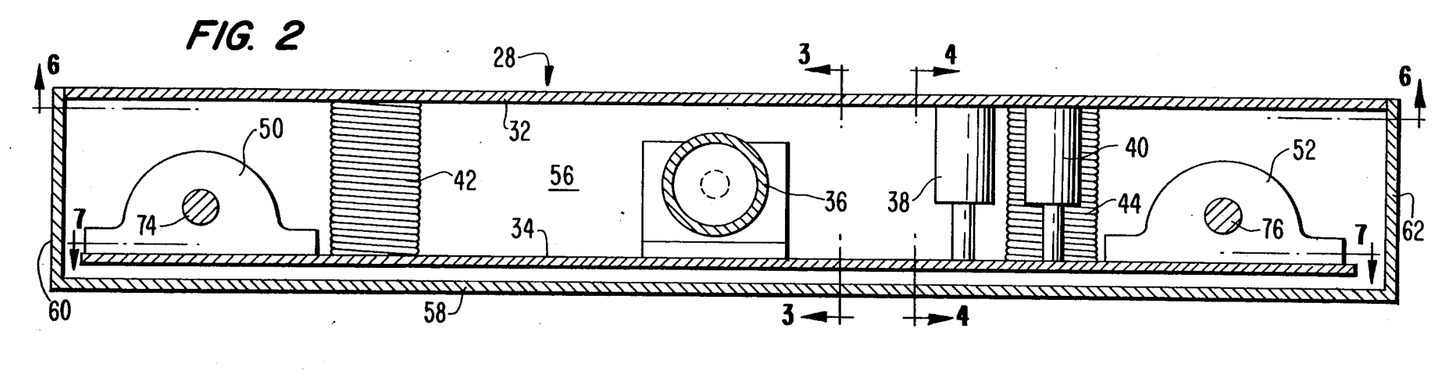
FIG. 2 is a cross-sectional top view of the plate assembly of the embodiment of this invention illustrated in FIG. 1, the cross section being taken at line 2—2 of FIG. 1.

Rod bearing blocks 50 and 52 are attached to the lower portion of front plate 34 and, in the embodiment illustrated in the Figures, are shaped as shown in FIG. 2. Rod bearing plates 50 and 52 include a bearing such that rods 74 and 76 (discussed below) can slide therethrough.

The housing, which includes back plate 32, top plate 54, bottom plate 56, front plate 58, and side housing plates 60 and 62, completely encompasses the various elements between back plate 32 and front plate 34 to protect the elements from dirt, grime and possible damage due to collisions. Plates 32 and 54–62 can be attached to each other by welding or by any other of the well-known attachment methods. Plates 54–62 are rectangularly shaped. Bottom plate 56 has holes therein for extendible rod 72 and rods 74 and 76 to pass through.

Figure 9:
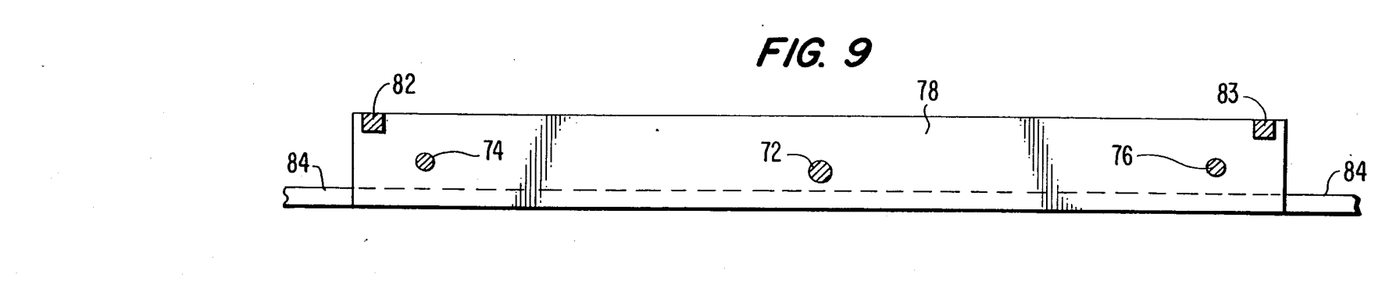
FIG. 9 is a top view of the top plate of the safety bar assembly illustrated in FIGS. 1, 3 and 8.

Safety bar assembly 30 includes top plate 78, bottom plate 80, top rail 82 and bottom rail 84. Top plate 78 is a rectangular plate oriented horizontally (see FIG. 9). The bottom end of extendible rod 72 is attached to the top of top plate 78. Rods 74 and 76 are also attached to top plate 78 and extend therethrough. Top rails 82 and 83 have one end connected to top plate 78. Bottom rail 84 is connected to the underside of the front edge of top plate 78 (see FIGS. 1 and 9).

Figure 10:
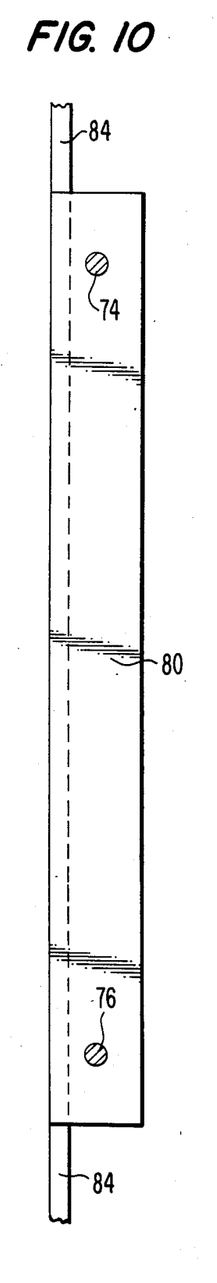
FIG. 10 is a top view of the bottom plate of the safety bar assembly illustrated in FIGS. 1, 3, and 8.

Bottom plate 80 is also a rectangular-shaped plate having a horizontal orientation. The lowermost ends of rods 74 and 76 are attached to the top of bottom plate 80 as shown in FIG. 10. The lowermost portion of bottom rail 84 is attached to the underside of bottom plate 80.

Figures 7, 8:
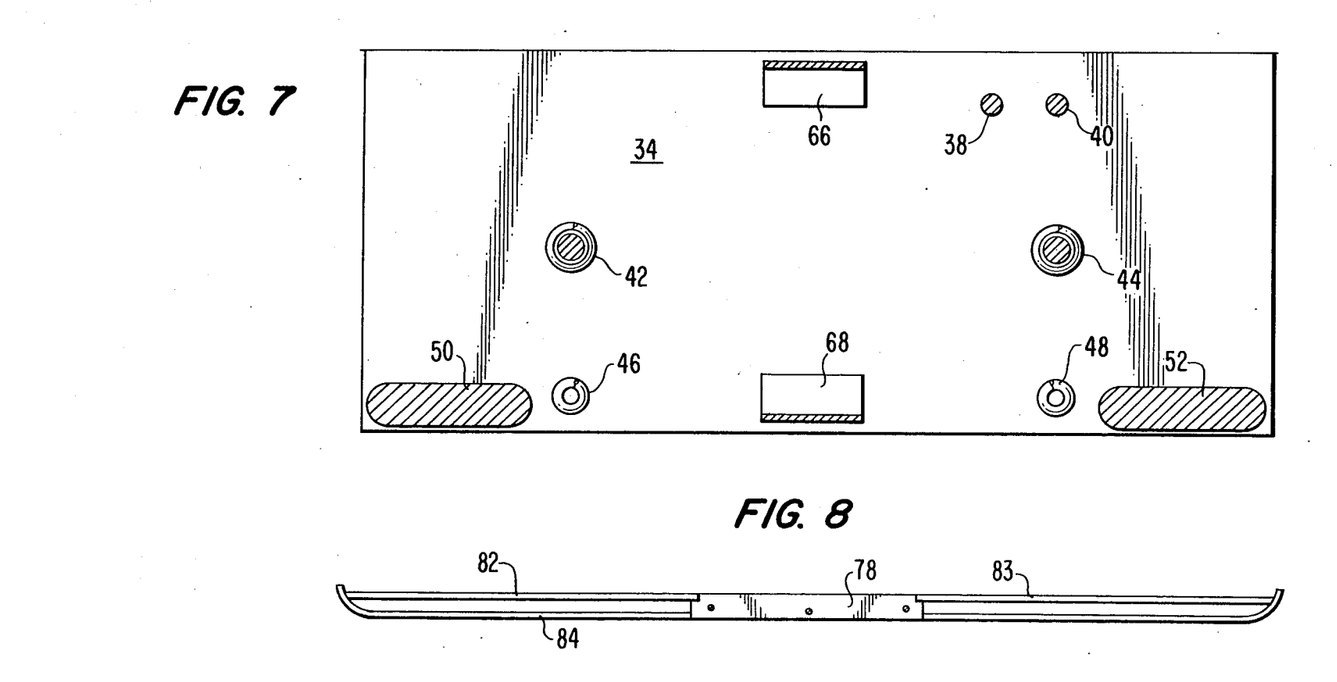
FIG. 7 is another cross-sectional view of the plate assembly illustrated in FIGS. 2-6, taken along line 7—7 of FIG. 2.
FIG. 8 is a top view of the safety bar assembly illustrated in FIGS. 1 and 3 taken along line 8—8 of FIG. 3.

Bottom rail 84 forms a continuous loop as illustrated in FIG. 1 and is connected to the underside of top plate 78 and bottom plate 80 as discussed above. The outermost ends of the closed loop are curved such that rail 84 extends around the sides of bus 24 as illustrated in FIG. 8. Top railings 82 and 83 extend from from top plate 78 to the outer portion of bottom rail 84. Top railings 82 and 83 and bottom railing 84 can either be comprised of a hollow tubular member or a solid rod. These railings are preferably made of metal, however, the railings can be of any material sufficiently strong to transmit forces which impact the railings without bending or being otherwise damaged.

Rods 74 and 76 extend up from bottom plate 80 through top plate 78 and bearing blocks 50 and 52. Rods 74 and 76 attach top plate 78 to bottom plate 80 and also serve to guide safety bar assembly 30 as safety bar assembly 30 is raised and lowered.

Figure 11:
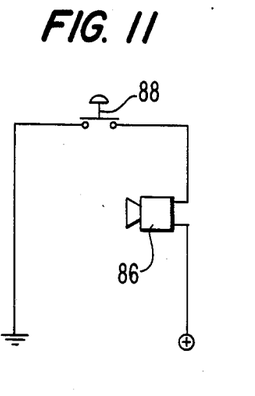
FIG. 11 is a schematic drawing of an electrical circuit including a horn which is activated when an object contacts the safety bar assembly illustrated in FIGS. 1, 3 and 8.

In some embodiments of this invention, a horn is activated inside the bus when the safety bar assembly 30 strikes an object. A circuit for this horn is illustrated schematically in FIG. 11. The illustrated circuit includes horn 86 and switch 88. Switch 88 is a part of switch assembly 38 and is normally open. Horn 86 emits a sound whenever switch 88 is moved to the closed position and completes the circuit.

Figure 12:
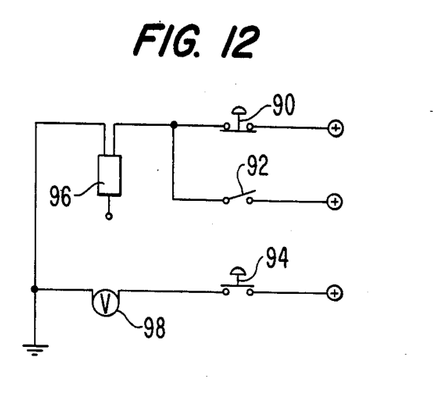
FIG. 12 is a schematic diagram of an electrical circuit for shutting off a diesel motor when the safety bar assembly illustrated in FIGS. 1, 3, and 8 is contacted by an object.

As stated above, the safety device 20 is designed to shut off the engine of the bus whenever safety bar assembly 30 is contacted by an object. A circuit for cutting off a diesel engine is illustrated in FIG. 12. This circuit includes switches 90, 92 and 94, solenoid valve 96 and air valve 98. Switch 90 is a normally closed switch which is a part of switch assembly 40. Switch 92 is a toggle switch located adjacent the driver of the bus so that the bus driver can override switch 90 if desired. Switch 94 is a normally open switch which may either be activated by the mechanism opening the door of the bus or by the mechanism operating the extendible stop arm of the bus.

Solenoid valve 96 controls the flow of fuel to the diesel engine. If switches 90 and 92 are open, then the solenoid valve 96 will be closed, preventing fuel from getting to the diesel engine. If either switch 90 or 92 is closed, then solenoid valve 96 will be open and fuel will be fed to the diesel engine.

Air valve 98 controls the fluid to the power cylinder assembly 36 for raising and lowering the safety bar assembly 30. When switch 94 is closed, air valve 98 will cause fluid to flow into or exit from power cylinder 70, thus extending extendible arm 72 and lowering safety bar assembly 30.

Figure 13:
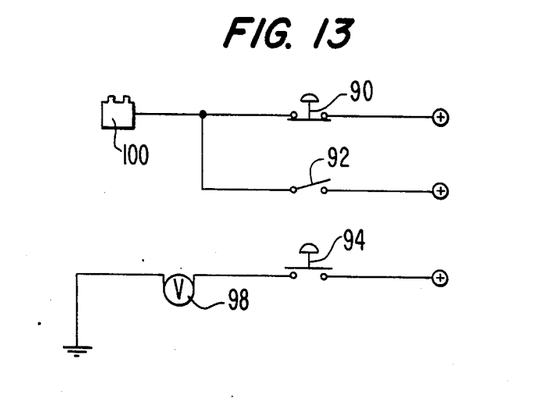
FIG. 13 is a schematic diagram of two electrical circuits which can be employed in the embodiment of this invention illustrated in FIGS. 1-10 to shut off a gasoline motor when the safety bar assembly comes into contact with an object.

FIG. 13 is a schematic illustration of two circuits to shut off a gasoline engine and to lower safety bar assembly 30. The circuits are much the same as the combined circuit for the diesel engine and includes the same switches 90, 92 and 94 and air valve 98. However, instead of switches 90 and 92 being in the circuit with solenoid valve 96, these switches are in a circuit with distributor 100. When switches 90 and 92 are both closed, distributor 100 is cut off from the power source, shutting off the gasoline motor.

Figure 14:
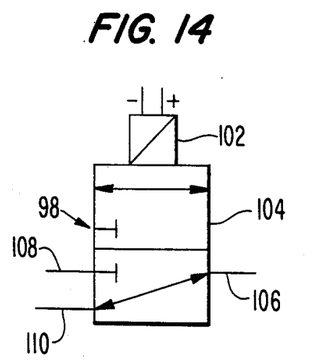
FIG. 14 is a schematic representation of an air valve assembly which can be employed in either of the circuits illustrated in FIGS. 12 and 13.
Figure 15:
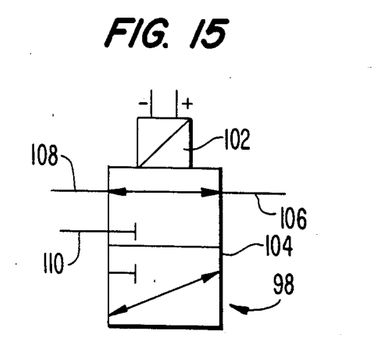
FIG. 15 is a schematic representation of another air valve assembly which can be employed in the circuits illustrated in FIGS. 12 and 13.

FIGS. 14 and 15 illustrate two embodiments of an air valve 98 which can be employed in the circuits illustrated in FIGS. 12 and 13. These air valves 98 include a solenoid valve 102, valve housing 104 and inlet/outlet lines 106, 108 and 110. Inlet/outlet line 106 connects valve 98 with power cylinder 70. Inlet/outlet line 108 connects valve 98 with a vacuum or power fluid system, such as an air reserve tank, hydraulic fluid tank, etc. Inlet/outlet line 110 is open to the atmosphere.

Safety device 20 can include a mechanism for heating plate assembly 28. This mechanism, which is not shown in the Figures, may include electric wire strip heaters or a heating device employing the heated fluid from the motor of school bus 24.

The embodiments illustrated in the Figures are employed as follows. After safety device 20 has been constructed as discussed above, it is attached to a bumper or another portion of a motor vehicle, such as bumper 22 of bus 24, by bolt assemblies 64. Safety device 20 is positioned such that when the safety bar assembly is in the up position (shown by the solid lines of FIG. 1) the lowermost portion of bottom rail 84 is approximately 12 inches above the ground surface.

The various electrical circuits are then connected to the power source for the vehicle and switch 94 is either attached to the mechanism for operating the door of the vehicle such that switch 94 is activated as the door is opened or closed or switch 94 is attached to the extendible stop sign arm such that switch 94 is operated by this mechanism. Regardless of whether switch 94 is connected to the door opening and closing mechanism or to the extendible stop sign arm, the system operates in the same manner.

Next, the inlet/outlet line 108 is connected to a power fluid source or to a vacuum mechanism. The power source or vacuum mechanism may be an existing device already on the vehicle or a separate device may be provided if necessary. If line 108 is connected to a power fluid source, line 108 carries fluid into valve housing 104 and out line 106. If line 108 is connected to a vacuum mechanism, then air travels from line 106 through valve housing 104 to line 108.

Once all the proper connections have been made, safety bar assembly 30 is lowered whenever the passenger door is opened or the extendible stop sign moved from its in to its out position.

When the air valve assembly illustrated in FIG. 14 is employed, and when switch 94 is activated by either the door opening mechanism or the extendible stop arm assembly, air valve 98 provides air (if power cylinder 70 is an air cylinder) to the power cylinder 70. The supplying of this air will cause extendible rod 72 to extend downward, thus moving the entire safety bar assembly 30 to its lowermost position (illustrated by the dashed lines in FIG. 1). When safety bar assembly 30 is in the lowermost position, the lowermost portion of bottom railing 84 is approximately 5-7 inches off the ground surface.

If the air valve assembly illustrated in FIG. 15 is employed, when switch 94 is activated, the solenoid causes this valve to release air from power cylinder 70 which has been holding safety bar assembly 30 in the up position. When the air pressure is released, gravity causes the safety bar assembly 30 to drop to its lowermost position.

When the door is closed, or the stop arm retracted, the opposite actions to those discussed above occur. If the air valve illustrated in FIG. 14 is employed in the circuits illustrated in FIGS. 12 and 13, then the pressure in power cylinder 70 will be released and a spring return is employed to return safety bar assembly 30 to its up position. This spring return is not illustrated in the Figures since it is well known in the industry.

When the air valve illustrated in FIG. 15 is employed, and when the school bus passenger door is closed or the stop arm retracted, solenoid valve 102 switches air valve 98 such that the power cylinder 70 is connected to the vacuum or compressed air system and causes power cylinder 70 to raise safety bar assembly 30.

In the embodiments illustrated in the Figures, safety device 20 will shut off the engine whenever safety bar assembly 30 contacts an object, regardless of whether it is in the up or down position. When safety bar assembly 30 contacts an object, it is pushed or swung backwards towards bus 24.

Since safety bar assembly 30 is connected to front plate 34 by rigid rods 74 and 76 and extendible rod 72, as safety bar assembly 30 is pushed backwards, front plate 34 rotates with respect to back plate 32 around its axis formed by pivot spring assemblies 42 and 44 (at its horizontal mid-line). This rotation causes switch assemblies 38 and 40 to be activated, setting off horn 86 and cutting off either solenoid valve 96 (if bus 24 has a diesel engine) or distributor 100 (if bus 24 has a gasoline motor). This shuts off either motor, thus stalling the vehicle and preventing it from running over the object. Switch 92 can be activated if the driver has a need to override the engine shut off feature.

Once the force is removed from safety bar assembly 30, the motor can be restarted and the bus 24 can resume operation.

Once given the above disclosure, many other embodiments, modifications and improvements will become apparent to those skilled in the art. Such other modifications, embodiments and improvements are considered to be within the scope of this invention as defined by the following claims.

What is claimed is:

1. A safety device for preventing a motor vehicle from running over an object, said safety device being attachable to said vehicle, said safety device comprising:
   a first assembly including first and second members, said members being spaced apart, said second member being pivotably connected to said first member;
   a safety bar assembly slidably connected to said second member of said first assembly;
   first means for raising and lowering said safety bar assembly with respect to said first assembly;
   at least one switch assembly extending between said members; and
   second means for turning off the motor vehicle, said switch assembly being connected to said second means;
   wherein when the safety bar assembly is contacted by an object, the second member pivots relative to the first member and causes said switch assembly and said second means to turn off the motor vehicle.

2. A safety device according to claim 1 wherein said members are flat plates positioned in parallel planes when the safety device is not in contact with an object.

3. A safety device according to claim 2 wherein said plates are vertically oriented when said safety device is attached to the vehicle.

4. A safety device according to claim 3 wherein said plates are rectangular.

5. A safety device according to claim 1 wherein said first member is attached to said motor vehicle.

6. A safety device according to claim 1 wherein said second member is rotatable about a horizontal axis.

7. A safety device according to claim 6 wherein said horizontal axis is located at an approximate mid-line of said second member.

8. A safety device according to claim 1 further comprising spring means extending between and connected to said first and said second members, said spring means functioning to maintain said members in parallel positions.

9. A safety device according to claim 1 wherein said first assembly includes at least two pivot arm assemblies attached on their ends to said plates, said second member being rotatable about said pivot arm assemblies, and a line connecting the points of connection of the pivot arm assemblies to the second member bisects said second member.

10. A safety device according to claim 1 wherein said safety bar assembly includes at least one railing that extends across the front of the motor vehicle.

11. A safety device according to claim 3 wherein said safety bar assembly extends below said first assembly.

12. A safety device according to claim 11 wherein said safety bar assembly is connected to said second member such that said safety bar assembly can only move away from or towards said second member, relative to said second member.

13. A safety device according to claim 1 wherein said first means is attached to said second member.

14. A safety device according to claim 13 wherein said first means is a fluid-operated power cylinder.

15. A safety device according to claim 1 wherein said safety bar assembly has at least two positions, an up position and a down position.

16. A safety device according to claim 1 wherein said safety bar assembly is in the down position when the door of the motor vehicle is opened and is in the up position at all other times.

17. A safety device according to claim 1 further comprising an alarm audio means, said alarm audio means being activated when the safety bar assembly strikes an object.

18. A safety device for preventing a motor vehicle from running over an object, said safety device being attached to said motor vehicle, said safety device comprising:

a plate assembly including a front and a back plate, said plates being spaced apart in parallel planes and oriented vertically when the device is not in contact with an object, said back plate being connected to said motor vehicle, said front plate being pivotably connected to said back plate;

a safety bar assembly slidably connected by rods to said front plate, said safety bar assembly being connected to said front plate such that it can slide towards and away from said front plate, said safety bar assembly having at least up and down positions;

a fluid motor assembly for raising and lowering said safety bar assembly, said fluid motor assembly being attached to said front plate;

at least one switch assembly attached to said back plate and extending to contact said front plate; and means for turning off the motor vehicle, said switch assembly being connected to said means;

wherein when the safety bar assembly is contacted by an object, said front plate pivots relative to said back plate and causes said switch assembly and means to turn off the motor.

19. A safety device according to claim 18 wherein one of said rods extends from the fluid motor assembly and slides in and out of said fluid motor assembly as the fluid motor assembly operates.

20. A safety device attached to the front of a school bus to prevent the bus from running over an object, said safety device comprising:

a plate assembly including a front plate and a back plate, said back plate being attached to said front of said bus, said plates being positioned in spaced parallel planes and oriented vertically when said device is not in contact with an object, said front plate being pivotably connected to said back plate;

a safety bar assembly slidably connected to said front plate, said safety bar assembly extending downward from said front plate, said safety bar assembly being connected to said front plate such that said safety bar assembly can only slide towards and away from said front plate relative to said front plate, said safety bar assembly having at least up and down positions;

first means for raising and lowering said safety bar assembly between said up and down positions, said first means being attached to said front plate;

at least one switch assembly attached to said back plate and extending to said front plate; and second means for turning off the motor vehicle, said switch assembly being connected to said second means;

wherein when the said safety bar assembly contacts an object, said front plate pivots relative to said back plate and causes said switch assembly and said second means to turn off the motor vehicle;

said safety bar assembly being in said down position whenever the school bus door is open and in said up position at all other times.

* * * * *